May 28, 1963 A. V. PADGETT 3,091,278
APPARATUS FOR SUPPORTING A VEHICLE FRAME FOR STRAIGHTENING
Filed Feb. 24, 1960 3 Sheets-Sheet 1
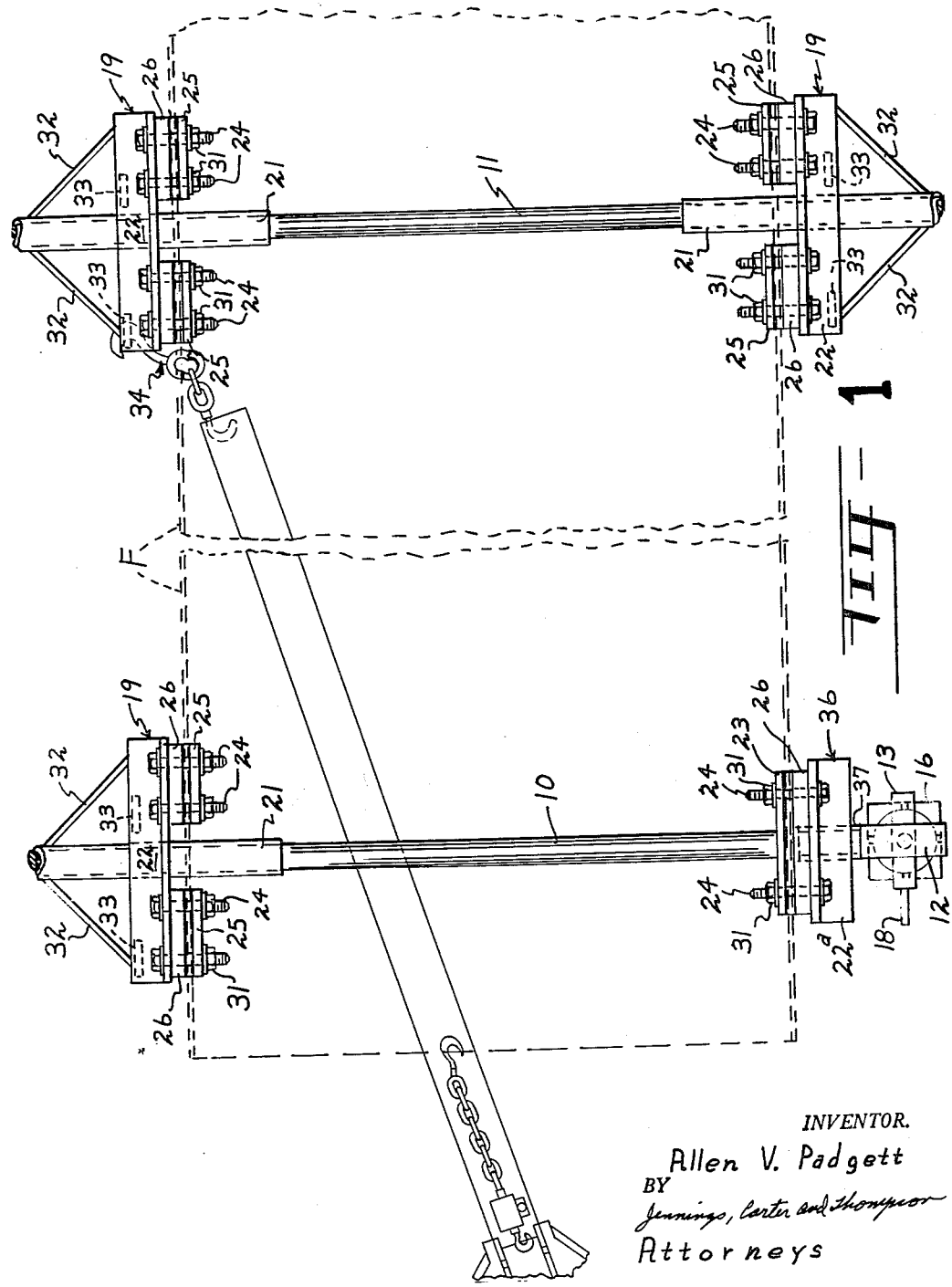
INVENTOR.
Allen V. Padgett
BY Jennings, Carter and Thompson
Attorneys

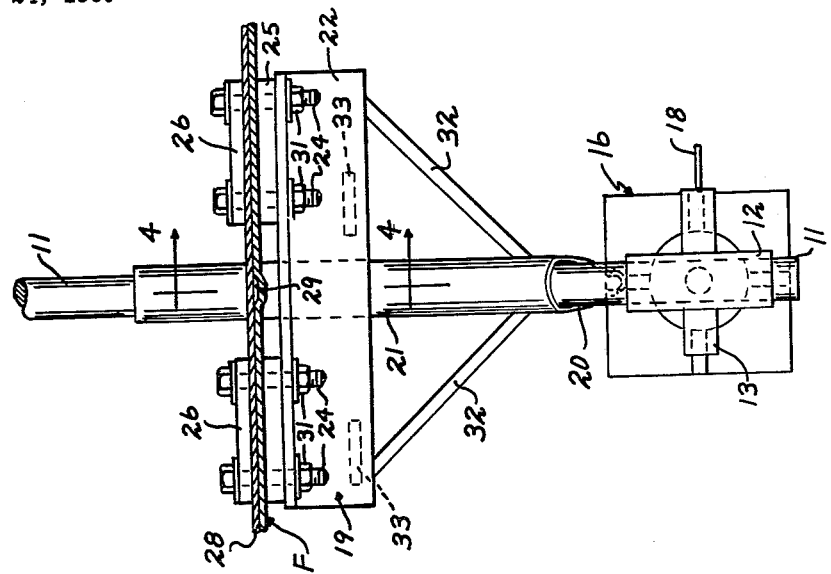
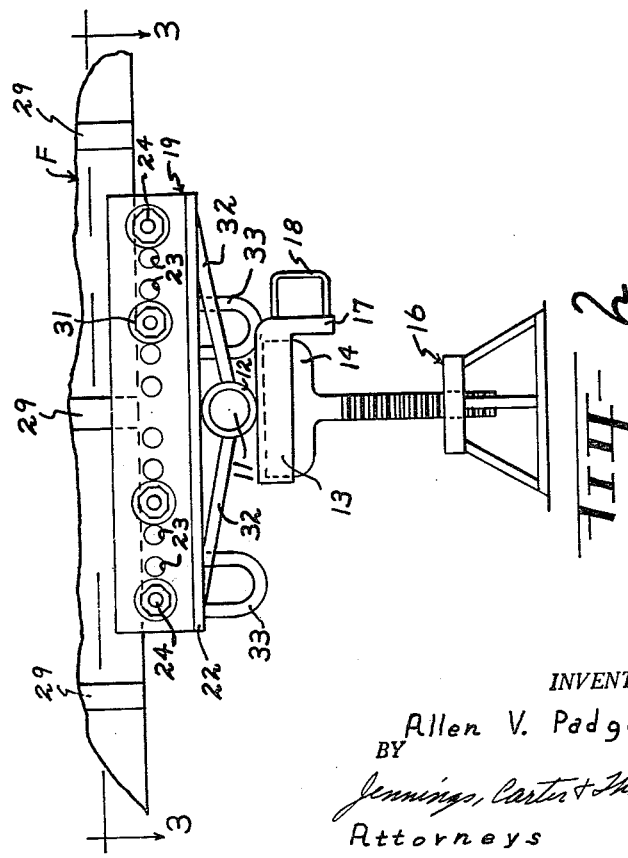

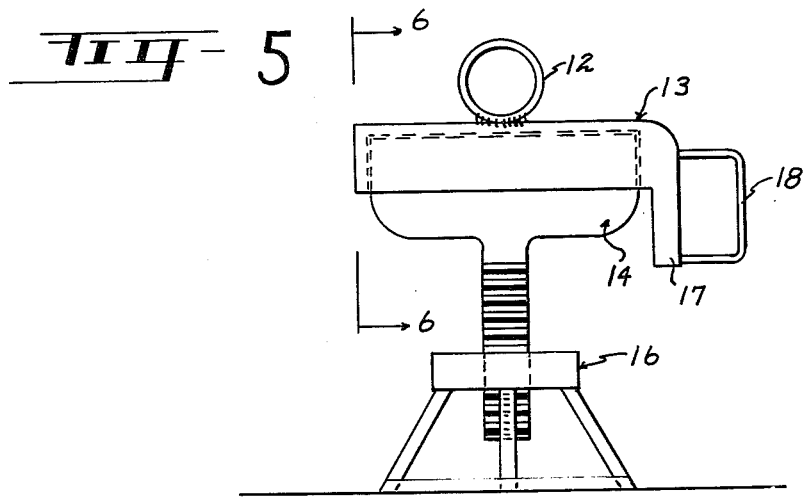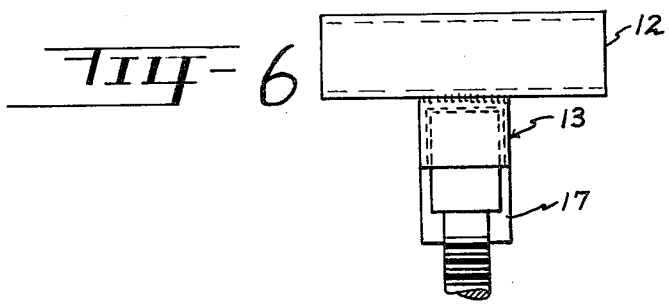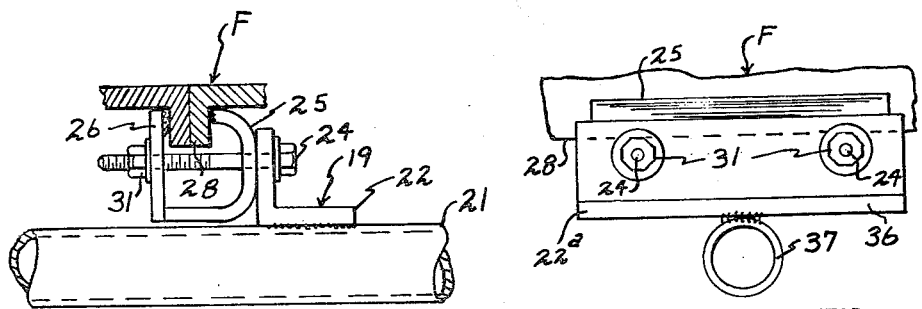

United States Patent Office 3,091,278
Patented May 28, 1963

3,091,278
APPARATUS FOR SUPPORTING A VEHICLE
FRAME FOR STRAIGHTENING
Allen V. Padgett, Birmingham, Ala., assignor to J. P. Company, Inc., a corporation of Alabama
Filed Feb. 24, 1960, Ser. No. 10,711
10 Claims. (Cl. 153—32)

This invention relates to apparatus for supporting a vehicle frame for straightening and more particularly to apparatus for supporting unitized vehicle frames which do not have the usual means associated therewith for attaching power pullers and the like.

An object of my invention is to provide apparatus for supporting a vehicle frame for straightening in which improved means is provided for clamping the apparatus rigidly to depending elements carried by the frame to be straightened.

Another object of my invention is to provide apparatus for supporting a vehicle frame for straightening in which the entire vehicle frame is supported by my improved apparatus while it is straightened, thereby eliminating danger of the frame falling.

A more specific object of my invention is to provide apparatus of the character designated which shall include improved clamping means for engaging the depending pinch-welds which are provided on conventional type unitized vehicle bodies, whereby one section of the body may be moved relative to another section thereof to straighten the same.

A still further object of my invention is to provide apparatus of the character designated which shall be simple of construction, economical of manufacture and one which is easily assembled and disassembled whereby the labor required to straighten a vehicle frame is reduced to a minimum.

Briefly, my improved apparatus comprises an elongated support bar supported adjacent opposite ends thereof beneath the vehicle frame to be straightened. Support brackets are mounted for sliding movement along the bar and carry clamp members which are disposed to engage the depending elements on the under surface of the vehicle body whereby the vehicle frame is secured to and supported by the support brackets.

Heretofore in the art to which my invention relates, various forms of frame straightening apparatus have been devised. However, so far as I am aware, such apparatus has not been adapted for use with unitized vehicle frames, such as the frames now employed on small foreign cars and the smaller cars made in the United States. That is, with the unitized vehicle frames, there is no means for tying the power puller to various sections of the vehicle frame. The only projection beneath the frame is the pinch-welds which are positioned beneath the frame and extend longitudinally adjacent opposite sides of the frame. Accordingly, in order to attach frame straightening apparatus to the frame, openings must be cut in the frame for attaching power pullers or the power puller must be attached to the pinch-welds. In view of the fact that the pinch-welds are relatively small and project only a small distance beneath the vehicle body, it has heretofore been impractical to attach the power puller to such pinch-welds. To overcome these and other difficulties, I provide apparatus which not only supports the vehicle frame to be straightened, but clamps the pinch-welds whereby a suitable power puller may be attached to straighten the frame. That is, the weight of the vehicle aids in holding the clamping means in firm engagement with the pinch-welds.

Apparatus embodying features of my invention is illustrated in the accompanying drawings, forming a part of this application, in which:

FIG. 1 is a plan view showing my improved apparatus associated with a vehicle frame having depending pinch-welds along the under surface thereof, the pinch-welds being shown in dotted lines;

FIG. 2 is an enlarged side elevational view showing the manner in which one element of the device is supported and attached to the vehicle frame, the vehicle frame being broken away;

FIG. 3 is a sectional view taken generally along the line 3—3 of FIG. 2;

FIG. 4 is a sectional view taken generally along the line 4—4 of FIG. 3 showing one means for clamping the device to the vehicle frame;

FIG. 5 is a side elevational view showing the means for supporting the elongated support bar beneath the frame;

FIG. 6 is a fragmental view taken generally along the line 6—6 of FIG. 5; and,

FIG. 7 is a side elevational view of a modified form of my invention showing the same clamped to a depending element of a vehicle frame, the depending element being broken away.

Referring now to the drawings for a better understanding of my invention, I show a pair of elongated guide members in the form of support bars 10 and 11 which extend transversely beneath the frame of the vehicle to be straightened which is indicated generally at F. As shown in FIGS. 1, 2 and 3, the ends of the support bars 10 and 11 extend through horizontal sleeves 12 which are supported by suitable means adjacent opposite sides of the vehicle frame to be straightened. Preferably, each sleeve member 12 is secured to a downwardly opening housing 13 which is adapted to telescope over the upper end of an adjustable support member 14. That is, the support member 14 is operatively connected to a suitable jack unit 16 whereby the elevation of the support member 14 may be varied. The downwardly opening housing 13 is provided with a depending member 17 at one side thereof and secured to the depending member is a handle 18 for inserting the sleeve 12 over the end of the elongated support member 10 or 11, as the case may be, whereby the hand of the operator is kept at a safe distance during insertion of the sleeve 12 onto the elongated member.

Mounted for sliding movement along the elongated support bars 10 and 11 intermediate the sleeves 12 are support brackets 19. Each support bracket 19 comprises a sleeve member 21 which is rigidly secured to one leg of an angle member 22, as clearly shown in FIG. 4. The outer end of the sleeve member 21 is cut away diagonally as at 20 whereby it slopes downwardly and outwardly to facilitate insertion of the support bar 10 or 11, as the case may be. That is, by providing the downwardly and outwardly sloped outer end on the sleeve 21, an end of the support bar may be positioned within the sloped portion of the sleeve and then moved axially into the sleeve. The other leg of angle member 22 is provided with a plurality of openings 23 therein for receiving bolts 24. Adjustably connected to the angle member 22 by the bolts 24 are clamping jaws 25 and 26 which are adapted to engage the depending elements carried by the frame F as clearly shown in FIG. 4. With conventional type unitized vehicle bodies, the depending elements 28 are in the form of pinch-welds having offset portions 29 therein at intervals to provide drainage between the connected sheets of metal, as shown in FIG. 3. The clamping jaws 25 and 26 are secured in place and urged toward each other by suitable nuts 31. By providing a plurality of longitudinally spaced openings 23 in the angle member 22, the clamping jaws 25 and 26 may be adjusted along the depending elements 28 whereby the clamping jaws do not compress the offset portions 29, thereby preventing closure of the drainage openings between the depending elements 28.

To reinforce the connection between the sleeve member 21 and its support bracket 19, diagonal braces 32 connect the sleeve member 21 to the angle bracket 22. Also secured to the angle bracket 22 are loop members 33 for attaching one end of a suitable power puller indicated generally at 34. The power puller may be of the type shown and described in my co-pending application Serial No. 769,260, filed October 23, 1958, and entitled "Apparatus for Straightening Vehicle Frames," now Patent No. 3,027,930.

Where it is desired to merely attach and support the vehicle frame F to my improved apparatus without imparting pull to a particular point, a support bracket 36 may be employed. As shown in FIGS. 1 and 7 the support bracket 36 comprises a single pair of clamping jaws 25 and 26 which are attached to a relatively short angle member 22ª. The angle member 22ª is provided with suitable openings therethrough for receiving the bolts 24 which pass through the clamping jaws 25 and 26 as described hereinabove. The clamping jaws 25 and 26 are urged toward each other and held in assembled relationship relative to the angle member 22ª by the nuts 31. The support bracket 36 is adapted for use in combination with the support brackets 19 to support the vehicle frame F, as shown in FIG. 1. That is, where the pull is to be applied at other points than the point at which the bracket 36 is attached to the frame F, the bracket 36 may be employed. In view of the fact that no pull is made at this point, the support bracket 36 is not provided with loops for attaching the power puller. The angle member 22 is secured to a sleeve member 37 by any suitable means, such as by welding. The sleeve member 37 may be supported by the jack 16 having a downwardly opening housing 13 mounted adjacent the upper end thereof, as described hereinabove. However, other suitable means may be employed for supporting the support brackets 36 and 19.

From the foregoing description, the operation of my improved apparatus will be readily understood. The frame F is elevated by suitable means and the elongated support bars 10 and 11 are inserted therebeneath. The support brackets 19 are mounted for sliding movement on the support bars 10 and 11 and the ends of the support bars are supported by the sleeve members 12 carried at the upper ends of the jack members 16. The support brackets 19 or the support brackets 19 and 36, as the case may be, are positioned along the support bars 10 and 11 whereby the clamping jaws 25 and 26 lie at opposite sides of the adjacent depending elements 28. The nuts 31 are then tightened whereby the clamping jaw 26 is moved toward the clamping jaw 25 to thereby clamp the depending elements 28 firmly therebetween. With the depending elements 28 thus clamped between the clamping jaws, the entire frame F is not only rigidly secured to the clamping jaws, but the entire frame is supported by the support brackets 19.

In view of the fact that the support brackets 19 are adapted for free sliding movement along the support bars 10 and 11, one part of the vehicle frame F may be moved relative to another part thereof whereby the frame may be straightened in a manner well understood in the art. That is, one end 34 of a power puller may be attached to selected ones of the loop members 33 carried by the movable support brackets 19 while another part of the vehicle frame F is attached to the power puller. Accordingly, pull may be applied in any direction to any particular part of the frame F. This is especially true in view of the fact that the support brackets 19 may be moved to any selected position along the vehicle body F by engaging the depending elements 28 at selected positions. Also, by providing a plurality of openings 23 in the angle members 22 of the support brackets, there is no damage to the drainage openings provided in the pinch-weld flanges of conventional type unitized bodies.

From the foregoing, it will be seen that I have devised improved apparatus for supporting a vehicle frame for straightening. By providing adjustable support brackets beneath the vehicle frame, pull may be applied to any selected part of the vehicle frame. Also, by providing clamping means which firmly engages the depending elements of the frame, the vehicle frame is not only secured in place by the support brackets, but is also supported thereby whereby the weight of the vehicle frame aids in holding the clamps in firm engagement with the depending elements. Furthermore, by providing support brackets which are adapted for free sliding movement along the supporting member therefor, the vehicle frame is straightened with a minimum loss of power and there is no danger of the vehicle falling off the frame straightening apparatus.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In apparatus for supporting a vehicle frame for straightening in which the frame has depending elements on the under surface thereof,
    (a) an elongated guide member,
    (b) means to support said guide member adjacent the ends thereof beneath said frame,
    (c) support brackets mounted for free longitudinal sliding movement along said guide member,
    (d) upwardly opening clamp members carried by said support brackets in position to receive and clamp said depending elements whereby said vehicle frame is secured to and supported by said support brackets while said support brackets are adapted for free movement along said guide member,
    (e) a power puller, and
    (f) means to attach said power puller to at least one of said support brackets to move the same and transmit force effecting straightening of said vehicle frame.

2. In apparatus for supporting a vehicle frame for straightening in which the frame has depending elements along the under surface adjacent opposite sides thereof,
    (a) a pair of elongated guide members disposed to extend transversely beneath said frame in generally parallel relation to each other,
    (b) means to support said guide members adjacent the ends thereof beneath said frame,
    (c) support brackets mounted for free longitudinal sliding movement along said guide members,
    (d) upwardly opening clamp members carried by said support brackets in position to receive and clamp said depending elements whereby said vehicle frame is secured to and supported by said support brackets while said support brackets are adapted for free movement along said guide members,
    (e) a power puller, and
    (f) means operatively connected to at least some of said support brackets for attaching said power puller to transmit force effecting straightening of said vehicle frame.

3. In apparatus for supporting a vehicle frame for straightening in which the frame has spaced apart depending elements along the under surface thereof,
    (a) an elongated support bar,
    (b) means to support said bar adjacent the ends thereof beneath said frame,
    (c) sleeve-like members slidably engaging said support bar adjacent the ends of said support bar and adapted for free longitudinal movement relative thereto, (d) a transverse bracket secured to each of said sleeve-like members, (e) a pair of upwardly opening clamping jaws mounted on each transverse bracket in position to receive and clamp one of said depending elements whereby the vehicle frame is secured to and supported by said transverse bracket while said sleeve-like members are adapted for free movement along said support bar, (f) a power puller, and (g) means operatively connected to the transverse bracket for attaching said power puller to transmit force effecting straightening of said vehicle frame.

4. In apparatus for supporting a vehicle frame for straightening as defined in claim 3 in which each pair of clamping jaws is adjustably mounted on said transverse bracket.

5. In apparatus for supporting a vehicle frame for straightening as defined in claim 3 in which there are at least two pairs of clamping jaws mounted on said transverse member, said pairs of clamping jaws being spaced from each other along said transverse member.

6. In apparatus for supporting a vehicle frame for straightening as defined in claim 3 in which the outermost ends of the sleeve-like members are cut away diagonally whereby they slope downwardly and outwardly to facilitate insertion of the support bar.

7. In apparatus for supporting a vehicle frame for straightening in which the frame has spaced apart depending elements along the under surface thereof, (a) at least one pair of spaced apart sleeve-like support members, (b) means supporting said sleeve-like members, (c) an elongated support bar extending through and supported by said sleeve-like members, (d) support brackets mounted for free longitudinal sliding movement along said bar, (e) upwardly opening clamp members carried by said support brackets in position to receive and clamp said depending elements whereby said vehicle frame is secured to and supported by said support brackets while said support brackets are adapted for free movement along said bar, (f) a power puller, and (g) means operatively connected to the support brackets for attaching said power puller to transmit force effecting straightening of said vehicle frame.

8. In apparatus for supporting a vehicle frame for straightening as defined in claim 7 in which each sleeve-like support member is mounted on a downwardly opening housing of a size to telescope over the upper portion of a supporting jack.

9. In apparatus for supporting a vehicle frame for straightening as defined in claim 8 in which the downwardly opening housing is provided with an outwardly extending handle whereby the sleeve-like support member may be moved into position with the operator's hand at a safe position.

10. In apparatus for supporting a vehicle frame for straightening in which the frame has spaced apart depending elements along the under surface thereof, (a) an elongated support bar, (b) means to support said bar adjacent the ends thereof beneath said frame, (c) sleeve-like members slidably engaging said support bar, (d) a transverse bracket secured to each of said sleeve-like members, (e) a first upwardly opening clamping jaw adjustably mounted on said transverse bracket, (f) a second upwardly opening clamping jaw mounted for movement toward and away from said first clamping jaw, (g) retaining means extending through said first and second jaws and adapted to move said second jaw relative to said first jaw whereby said depending element is clamped therebetween and the vehicle frame is secured to and supported by said transverse bracket while said sleeve-like members are adapted for free movement along said bar, (h) a power puller, and (i) means to attach said power puller to said transverse bracket to move the same and transmit force effecting straightening of said vehicle frame.

References Cited in the file of this patent

UNITED STATES PATENTS

| | | |
|---|---|---|
| 1,164,395 | Reiselt | Dec. 14, 1915 |
| 1,341,809 | Lee | June 1, 1920 |
| 1,508,012 | Danielson | Sept. 9, 1924 |
| 1,600,835 | Manley | Sept. 21, 1926 |
| 1,949,007 | Butler | Feb. 27, 1934 |

FOREIGN PATENTS

| | | |
|---|---|---|
| 20,247 | Great Britain | July 17, 1913 |
| 502,994 | Great Britain | Mar. 29, 1939 |